US011851895B2

(12) United States Patent
Bunch et al.

(10) Patent No.: US 11,851,895 B2
(45) Date of Patent: Dec. 26, 2023

(54) GROUT FLOAT AND HANDLE FOR USE WITH SAME

(71) Applicant: Acufloor, L.L.C., North Richland Hills, TX (US)

(72) Inventors: Clinton D. Bunch, Keller, TX (US); Joshua A. Bunch, Keller, TX (US)

(73) Assignee: Acufloor, LLC, North Richland Hills, TX (US)

( * ) Notice: Subject to any disclaimer, the term of this patent is extended or adjusted under 35 U.S.C. 154(b) by 0 days.

(21) Appl. No.: 17/936,251

(22) Filed: Sep. 28, 2022

(65) Prior Publication Data

US 2023/0101568 A1 Mar. 30, 2023

Related U.S. Application Data

(60) Provisional application No. 63/261,752, filed on Sep. 28, 2021.

(51) Int. Cl.

| | |
|---|---|
| ***E04F 21/165*** | (2006.01) |
| ***B25G 1/10*** | (2006.01) |
| *B65G 1/10* | (2006.01) |

(52) U.S. Cl.

CPC ............ *E04F 21/165* (2013.01); *B25G 1/102* (2013.01)

(58) Field of Classification Search

CPC ....... E04F 21/16; E04F 21/161; E04F 21/162; E04F 21/163; E04F 21/165; E04F 21/1652; E04F 21/06; B25G 1/102; B25G 1/10; Y10T 16/502; Y10T 16/513

USPC ........... 15/235.4, 235.5, 235.6, 235.7, 235.8, 15/143.1; 16/430

See application file for complete search history.

(56) References Cited

U.S. PATENT DOCUMENTS

| | | | | | |
|---|---|---|---|---|---|
| 1,825,080 | A * | 9/1931 | Morford | E04F 21/06 | 15/235.4 |
| 3,010,133 | A * | 11/1961 | Hurd | E04F 21/06 | 15/235.4 |
| 5,781,956 | A * | 7/1998 | Kelsay | E04F 21/163 | 15/235.4 |
| D426,134 | S | 6/2000 | Pytlewski | | |
| 6,604,256 | B1 | 8/2003 | Pytlewski | | |
| 2004/0231100 | A1 | 11/2004 | Schultz et al. | | |
| 2013/0133283 | A1 | 5/2013 | Floyd et al. | | |
| 2018/0148938 | A1 | 5/2018 | Chang et al. | | |

* cited by examiner

*Primary Examiner* — Lee D Wilson
*Assistant Examiner* — Alberto Saenz
(74) *Attorney, Agent, or Firm* — Scott Griggs; Griggs Bergen LLP

(57) ABSTRACT

A grout float and a handle for use with the same are disclosed. In one embodiment of the grout float, the handle is secured to a blade, which may be encased with a pliable pad. The handle includes two mounting noses. Each of the two mounting noses includes a pair of lateral sidewalls traversing lateral surfaces of the handle and burgeoning downwardly. The lateral sidewalls transfer force from the handle to the blade upon the pliable pad of the grout float angularly contacting a work surface. A gripping portion of the handle located between the two mounting noses may having a non-linear profile.

21 Claims, 6 Drawing Sheets

GROUT FLOAT AND HANDLE FOR USE WITH SAME

PRIORITY STATEMENT & CROSS-REFERENCE TO RELATED APPLICATIONS

This application claims priority from U.S. Patent Application No. 63/261,752, entitled "Grout Float and Handle for Use with Same" and filed on Sep. 28, 2021, in the name of Clinton D. Bunch et al.; which is hereby incorporated by reference, in entirety, for all purposes.

This application discloses subject matter related to the subject matter disclosed in the following commonly owned, patent application: (1) "Grout Float and Grout Float Handle," filed on Sep. 28, 2022, Application No. 29/866,814, in the names of Clinton D. Bunch et al., which is hereby incorporated by reference, in entirety, for all purposes.

TECHNICAL FIELD OF THE INVENTION

This invention relates, in general, to tools, such as hand tools, and, in particular, to a grout float and a handle for use with the same that provides improved ergonomics under a variety of work conditions associated with the installation of tile.

BACKGROUND OF THE INVENTION

Without limiting the present invention, the background of the invention will be described with relation to grout floats. When using a grout float, it is common that different work surfaces and work techniques require different angles and different hand grasps on the handle of the grout float. Handles of grout floats cannot adjust to the angle and as a result, ergonomics is lost and inconvenience to the user is created. As a result of these ergonomic challenges, there is a need for improved grout floats and handles for use with the same.

SUMMARY OF THE INVENTION

It would be advantageous to achieve an improved grout float and a handle for use with the same. It would be desirable to enable a mechanical-based solution that would provide enhanced ergonomics and convenience regardless of the work surface or work technique required for a job. To better address one or more of these concerns, a grout float and handle for use with the same are disclosed. In one embodiment of the grout float, a handle is secured to a blade, which may be encased with a pliable pad. The handle includes two mounting noses. Each mounting nose includes a pair of lateral sidewalls traversing lateral surfaces of the handle and burgeoning downwardly. The lateral sidewalls transfer force from the handle to the blade upon pliable pad of the grout float angularly contacting a work surface. A gripping portion of the handle located between the two mounting noses may having a non-linear profile.

In another embodiment, the handle for use with the grout float has a similar construction. A body of the handle includes two mounting noses each having a pair of lateral sidewalls traversing lateral surfaces of the handle and burgeoning downwardly, while tapering upward. As mentioned above, this construction enables a transfer of force through the handle. A gripping portion of the handle located between the two mounting noses may have a non-linear profile. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Figure 1:
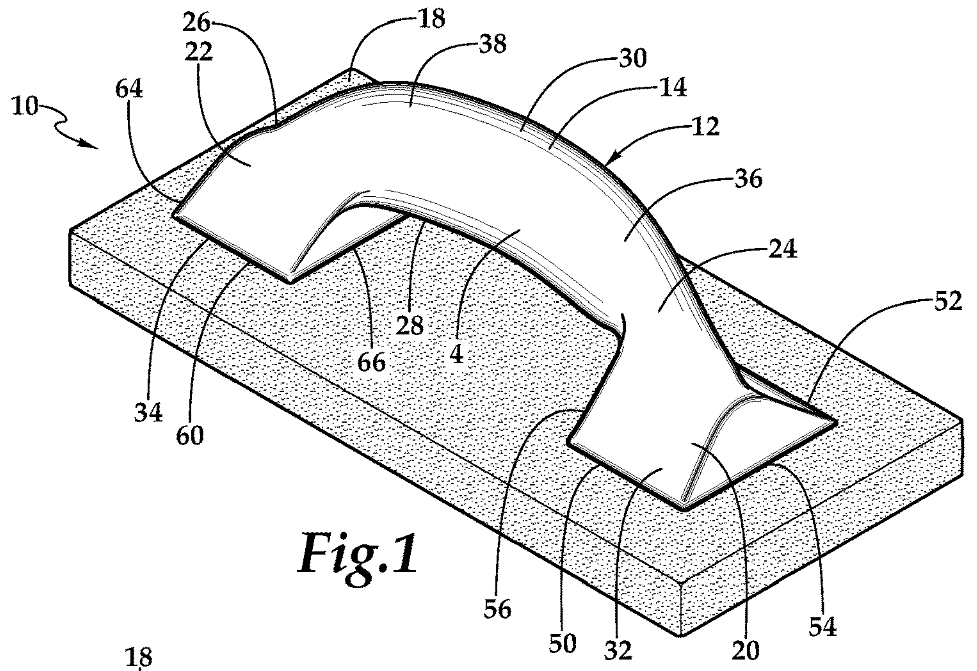
FIG. 1 is a side perspective view of one embodiment of a grout float and a handle for use of the same, according to the teachings presented herein.
Figure 2:
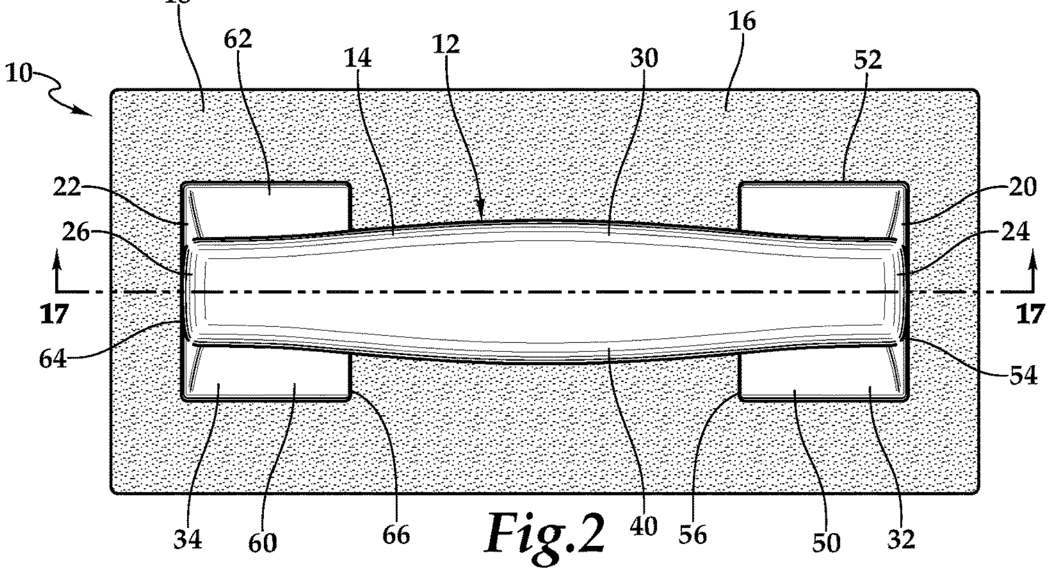
FIG. 2 is a top plan view of the of the grout float and the handle for use of the same depicted in FIG. 1.
Figure 3:
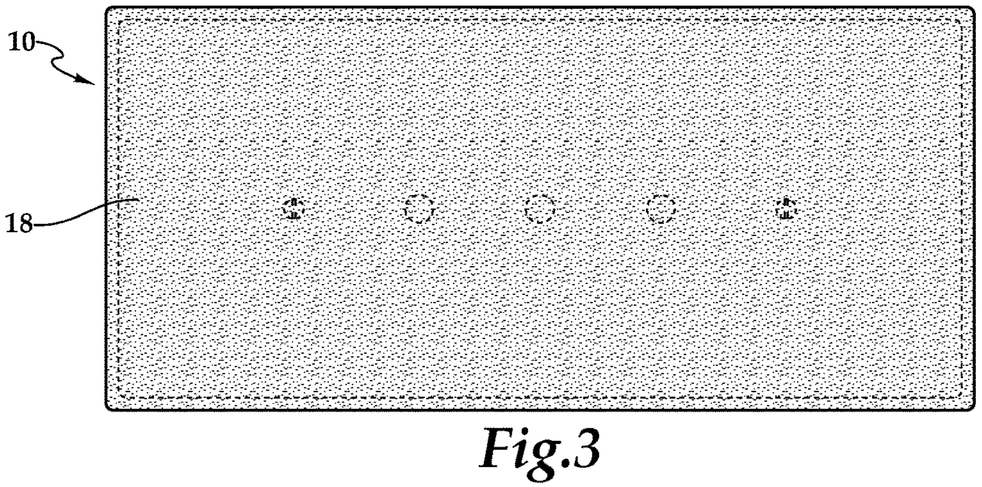
FIG. 3 is a bottom plan view of the grout float and the handle for use of the same depicted in FIG. 1.
Figure 4:
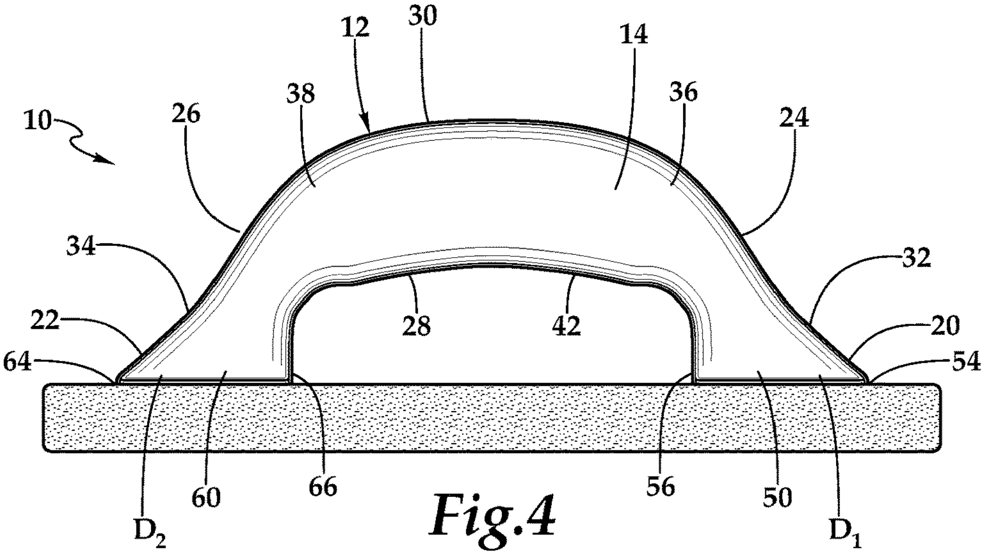
FIG. 4 is a left-side elevation view of the grout float and the handle for use of the same depicted in FIG. 1.
Figure 5:
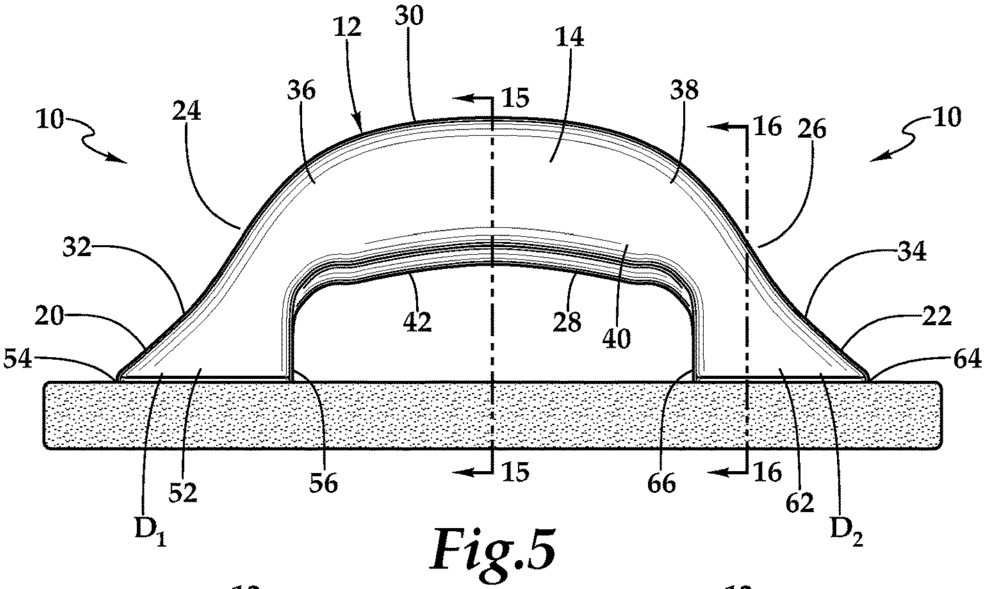
FIG. 5 is a right-side elevation view of the grout float and the handle for use of the same depicted in FIG. 1.
Figure 6:
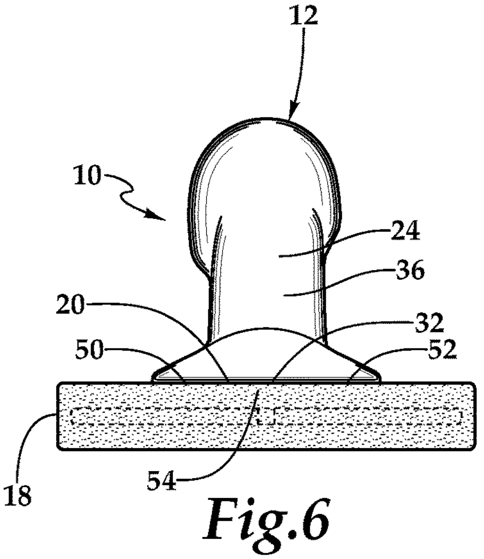
FIG. 6 is a front elevation view of the grout float and the handle for use of the same depicted in FIG. 1.
Figure 7:
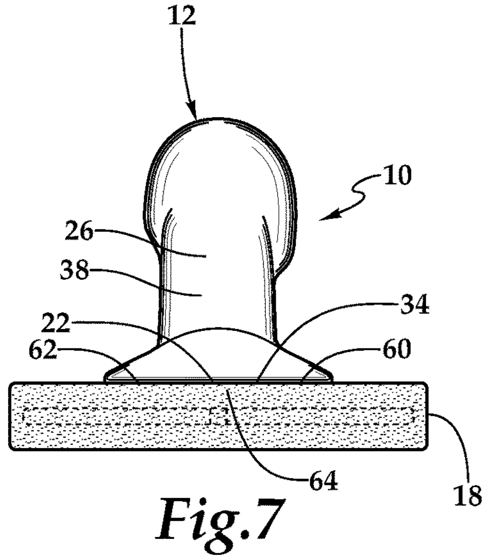
FIG. 7 is a rear elevation view of the grout float and the handle for use of the same depicted in FIG. 1.
Figure 8:
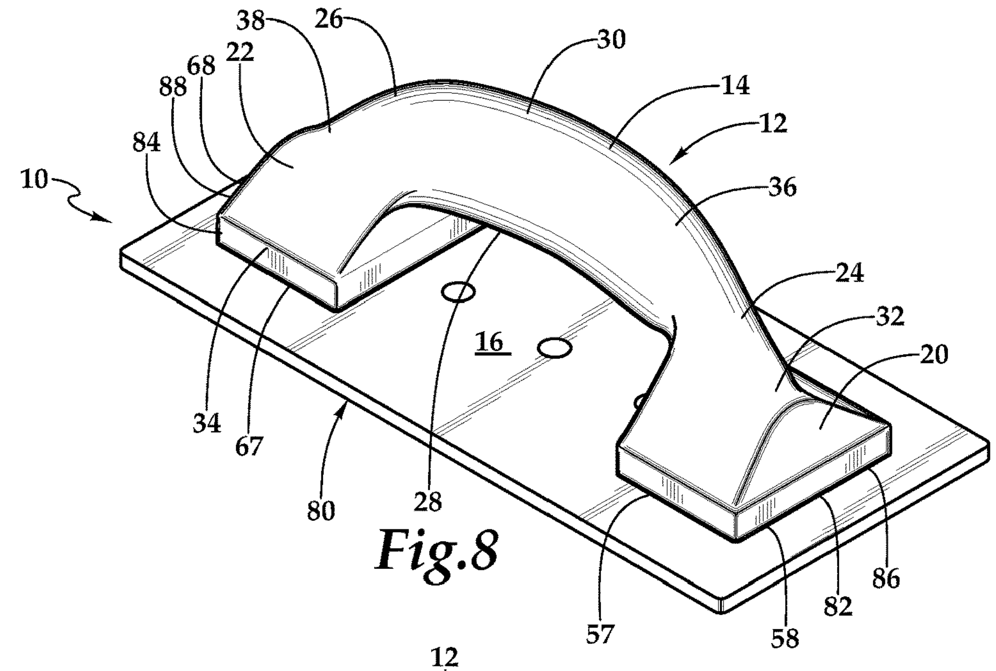
FIG. 8 is a side perspective view of a portion of the grout float with the handle for use of the same depicted in FIG. 1.
Figure 9:
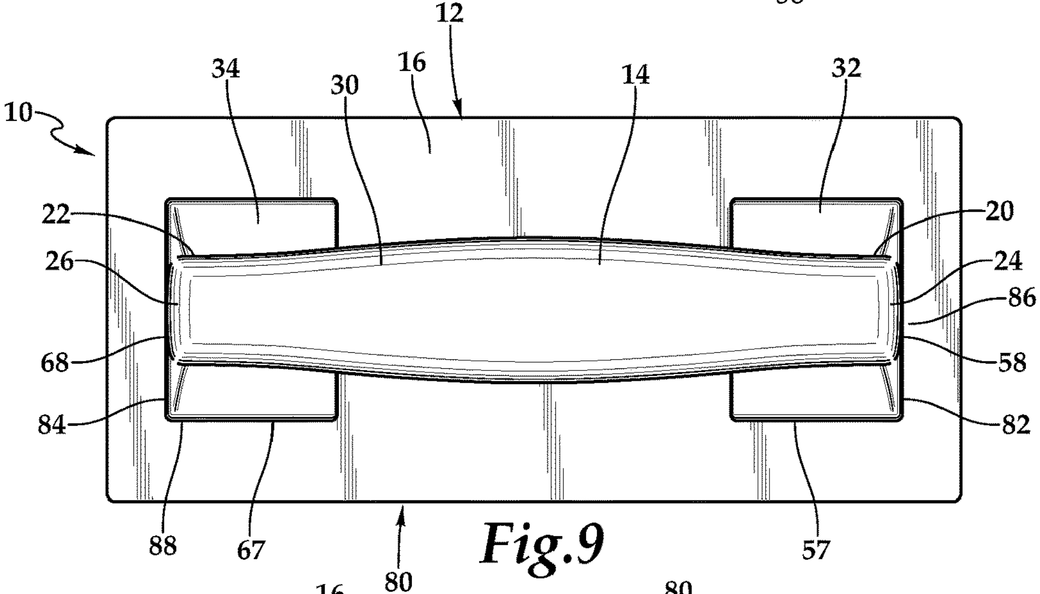
FIG. 9 is a top plan view of a portion of the grout float with the handle for use of the same depicted in FIG. 1.
Figure 10:
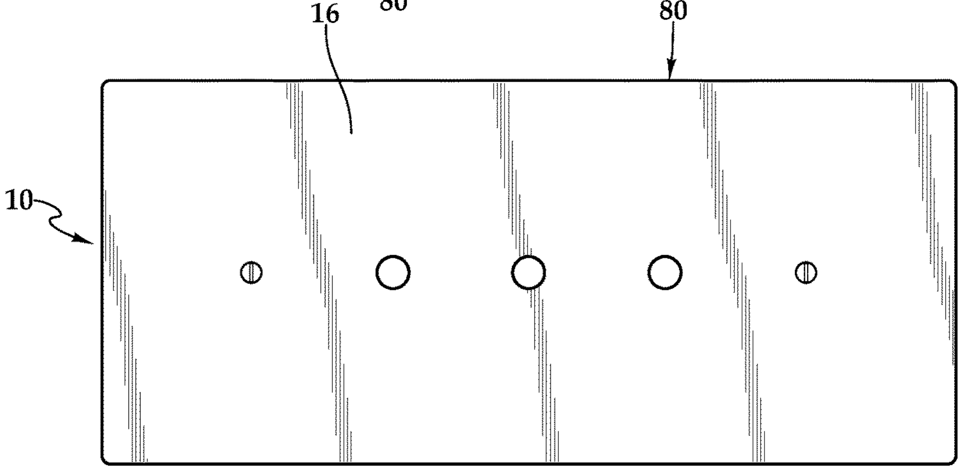
FIG. 10 is a bottom plan view of a portion of the grout float with the handle for use of the same depicted in FIG. 1.
Figure 11:
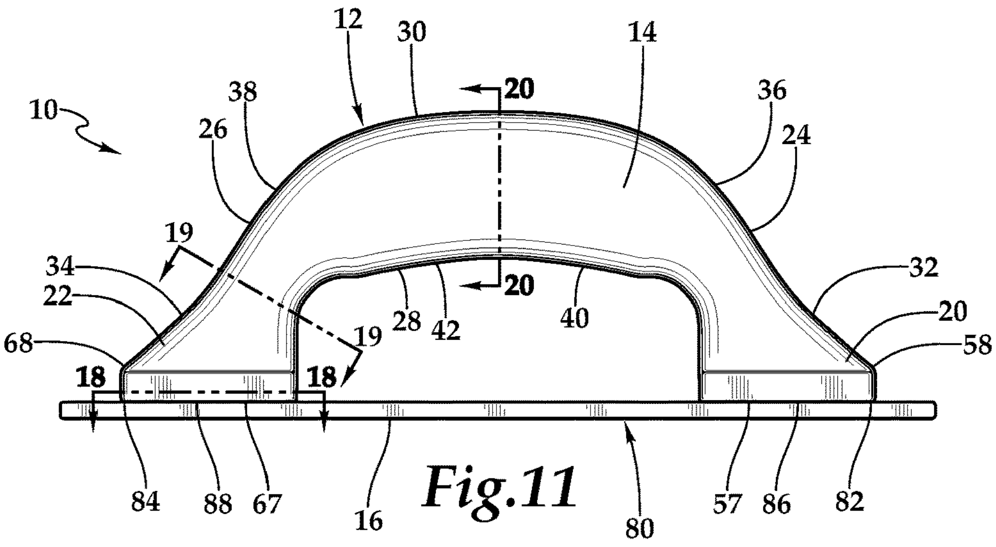
FIG. 11 is a left-side elevation view of a portion of the grout float with the handle for use of the same depicted in FIG. 1.
Figure 12:
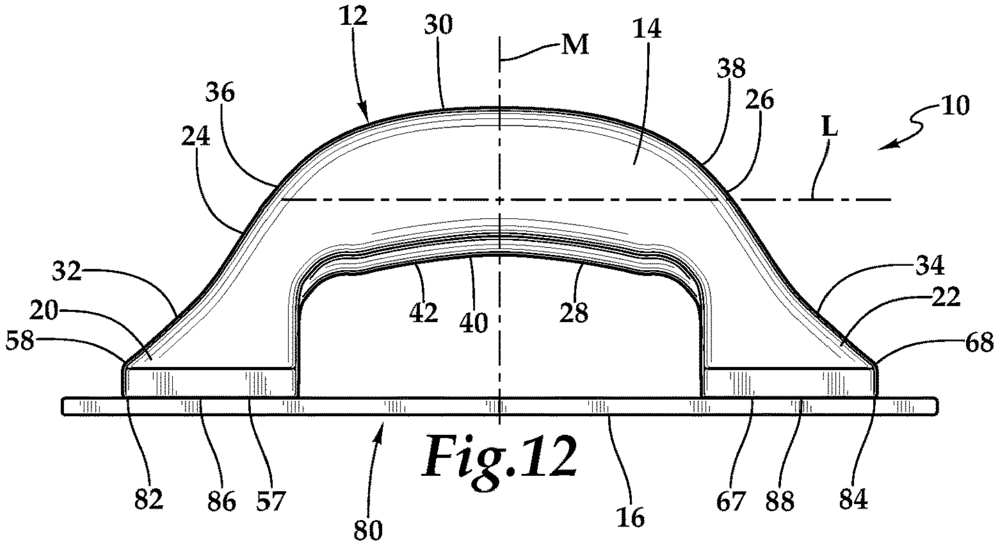
FIG. 12 is a right-side elevation view of a portion of the grout float with the handle for use of the same depicted in FIG. 1.
Figure 13:
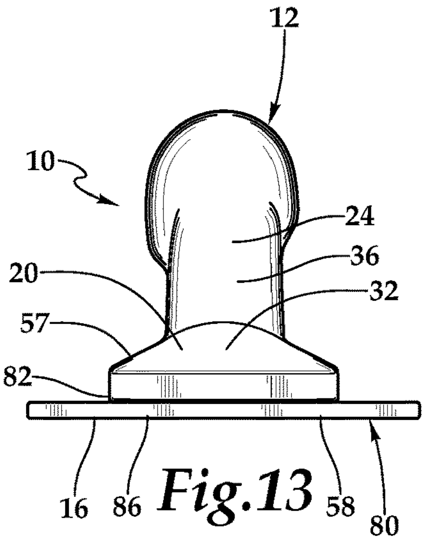
FIG. 13 is a front elevation view of a portion of the grout float with the handle for use of the same depicted in FIG. 1.
Figure 14:
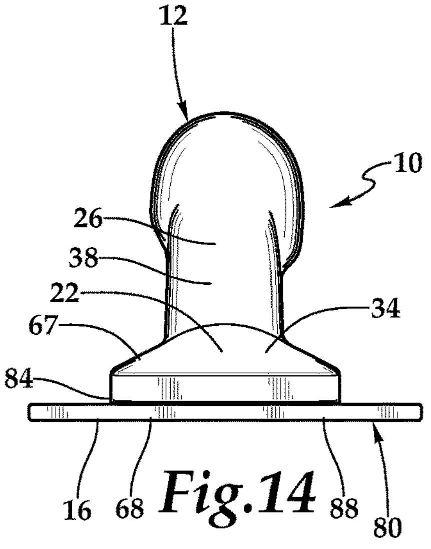
FIG. 14 is a rear elevation view of a portion of the grout float with the handle for use of the same depicted in FIG. 1.
Figure 15:
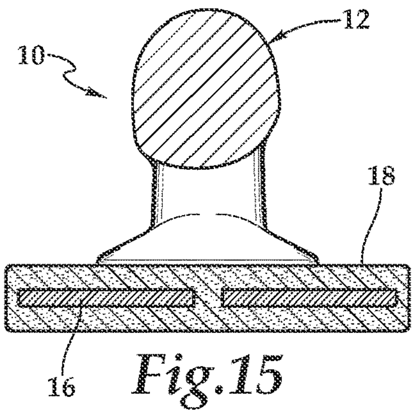
FIG. 15 is a cross-sectional view of a portion of the grout float with the handle for use of the same along line 15-15 of FIG. 5.
Figure 16:
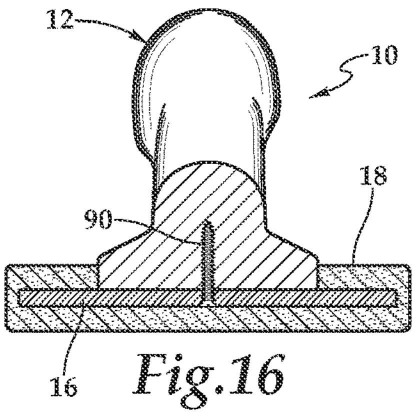
FIG. 16 is a cross-sectional view of a portion of the grout float with the handle for use of the same along line 16-16 of FIG. 5.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1 through FIG. 20, therein is depicted one embodiment of a grout float, which is schematically illustrated and designated 10. In the illustrated embodiment, the grout float 10 is a hand tool resembling a trowel that is designed to press grout or another material into joints between tile or stone, for example. The grout float 10 may be utilized by professional tile and stone installers or do-it-yourself installers. A handle 12 has a body 14 that is secured to a blade 16, which is encased with a pliable pad 18.

The handle 12 includes ends 20, 22 with lateral surfaces 24, 26, an inner surface 28, and an outer surface 30 therebetween. The handle 12 includes a longitudinal axis L bisected by a medial axis M. Mounting noses 32, 34 are respectively positioned at the end 20 and the end 22. As shown, the mounting nose 32 transitions upwardly to a neck 36 and the mounting nose 34 also transitions upwardly to a neck 38. The handle 12 including a gripping portion 40 interposed between the neck 36 and the neck 38. The gripping portion 40 may include a U-shaped grip recess 42 beneath the handle 12 and above the blade 16.

The mounting nose 32 includes lateral sidewalls 50, 52 traversing the respective lateral surfaces 24, 26 of the handle 12. The lateral sidewalls 50, 52 are burgeoning from proximate the neck 36 to the blade 16. That is, the lateral sidewalls 50, 52 may taper upward from the blade 16 to the neck 36. A front sidewall 54 descends from the neck 36 to the blade 16 along the outer surface 30 of the handle 12. Similarly, a rear sidewall 56 descends from the neck 36 to the blade 16 along the inner surface 28 of the handle 12. Each of the front sidewall 54 and the rear sidewall 56 may have a tapering from the blade 16 to the appropriate neck, the neck 36 or the neck 38. Likewise, each of the front sidewall 54 and the rear sidewall 56 may have a tapering from a neck—the neck 36 or the neck 38—to the blade 16. The mounting nose 30 also includes a base 57 having an upper blade mount 58.

Analogous to the mounting nose 32, the mounting nose 34 includes lateral sidewalls 60, 62 traversing the respective lateral surfaces 24, 26 of the handle 12. The lateral sidewalls 60, 62 burgeoning from proximate the neck 38 to the blade 16. That is, the lateral sidewalls 60, 62 may taper upward from the blade 16 to the neck 38. A front sidewall 64 descends from the neck 38 to the blade 16 along the outer surface 30 of the handle 12. Similarly, a rear sidewall 66 descends from the neck 38 to the blade 16 along the inner surface 28 of the handle 12. Each of the front sidewall 64 and the rear sidewall 66 may have a tapering from the blade 16 to the appropriate neck, the neck 36 or the neck 38 or a tapering from a neck—the neck 36 or the neck 38—to the blade 16. The mounting nose 32 also includes a base 67 having an upper blade mount 68.

In the illustrated embodiments, the lateral sidewalls 50, 52, 60, 62 are more distal to the longitudinal axis L than the gripping portion 40, as shown by indications of distal positioning $D_1$, $D_2$. As will be discussed in additional detail hereinbelow, this enables the lateral sidewalls 50, 52, 60, 62 to transfer force from the handle 12 to the blade 16 upon the pliable pad 18 of the grout float 10 angularly contacting a work surface, such as tile or stone, for example. In particular, the additional volume and location of the volume afforded by the lateral sidewalls 50, 52, 60, 62 of the respective mounting noses 30, 32 transfers a greater amount of force from the handle 12.

In one embodiment, as shown, the gripping portion 40 of the grout float 10 includes at the intersection of the longitudinal axis L and the medial axis M, a zenith 70 and a nadir 72. The zenith 70 may be non-linear with respect to the longitudinal axis L and the medial axis M. Alternatively, the zenith 70 may be non-linear with respect to the longitudinal axis L or the zenith 70 may be non-linear with respect to the medial axis M. Also, the nadir 72 may be non-linear with respect to the longitudinal axis L and the medial axis M. Alternatively, at the intersection of the longitudinal axis L and the medial axis M, the nadir 72 may be non-linear with respect to the longitudinal axis L or non-linear with respect to the medial axis M. Also, in some embodiments, both the zenith 70 and the nadir 72 are non-linear with respect to the longitudinal axis L and the medial axis M.

Tools, such as grout floats, with straight handles are typically for tasks where the force is exerted perpendicular to the straightened forearm and wrist, for instance, when the force must be applied vertically through a handle to a perpendicular blade. The non-linear portions of at least one of the zenith 70 and the nadir 72 provide the gripping portion 40 with a profile that furnishes an ergonomic grip that is not only comfortable and efficient for tasks where the force is exerted perpendicular to the straightened forearm and wrist, but also furnishes an ergonomic grip that is comfortable and efficient for tasks where the force is exerted angularly to the straightened forearm and wrist.

The handle 12 of the grout float 10 may be constructed with an exterior layer molded over a handle core. The exterior layer may cover the entire handle 12, including the gripping portion 40, necks 36, 38, and mounting noses 32, 34, or a portion thereof. The exterior layer may include a single layer of overmolded resilient material, such as a thermoplastic material or thermoplastic elastomer. Such materials provide many rubberlike qualities, such as a soft, non-slip, rubber-like surface having a favorable grip profile with ergonomic comfort for the installer.

Figure 17:
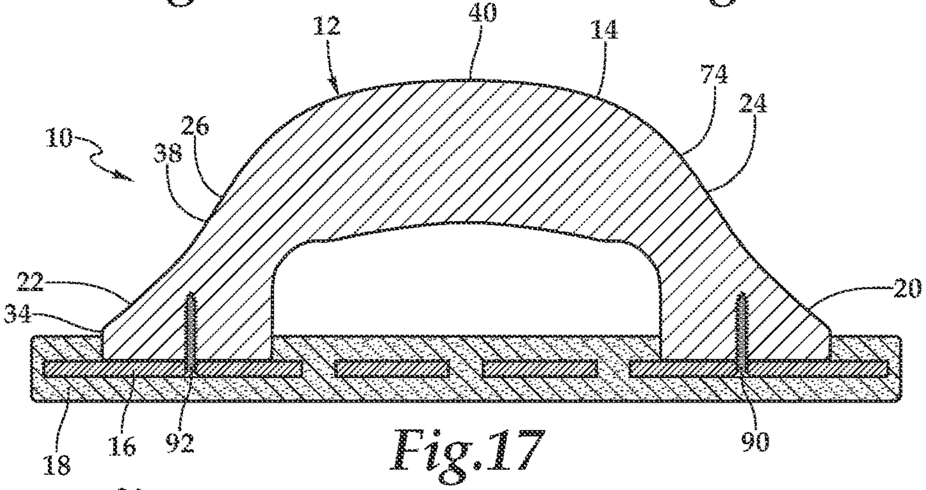
FIG. 17 is a cross-sectional view of a portion of the grout float with the handle for use of the same along line 17-17 of FIG. 3.
Figure 18:
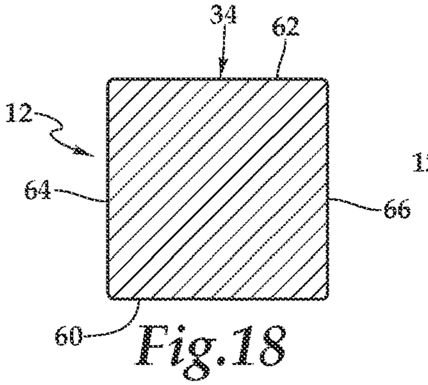
FIG. 18 is a cross-sectional view of a portion of the grout float with the handle for use of the same along line 18-18 of FIG. 4.
Figure 19:
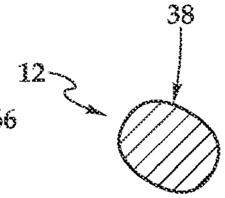
FIG. 19 is a cross-sectional view of a portion of the grout float with the handle for use of the same along line 19-19 of FIG. 4.
Figure 20:
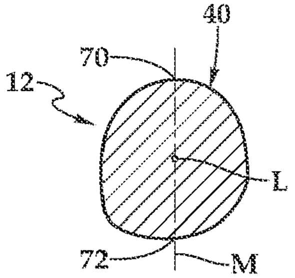
FIG. 20 is a cross-sectional view of a portion of the grout float with the handle for use of the same along line 20-20 of FIG. 4.

In one embodiment, the blade 16 may include a rectangular member 80 that may be made of steel or metal. The rectangular member 80 includes lower blade mounts 82, 84 that are integrally formed with the rectangular member 80 to provide a pair of coplanar mounting interfaces 86, 88 where the upper blade mount 58 of the handle 12 aligns with the lower blade mount 82 and the upper blade mount 68 of the handle 12 aligns with the lower blade mount 84. A pair of fasteners 90, 92, as best shown in FIG. 17, such as screws, secure the handle 12 against the blade 16. The pliable pad 18 is secured about the blade 16 and may be secured about portions of the handle 12, such as the mounting noses 30, 32. The pliable pad 18 may be made of rubber, urethane or polyproxylene, for example, and may vary in stiffness and elasticity depending on the project. A work surface, such as a particularly soft tile, that is prone to starching, will require a pliable pad 18 of greater elasticity. On the other hand, a coarse grout and rough stone would require the pliable pad 18 to be harder and less elastic.

Figure 21:
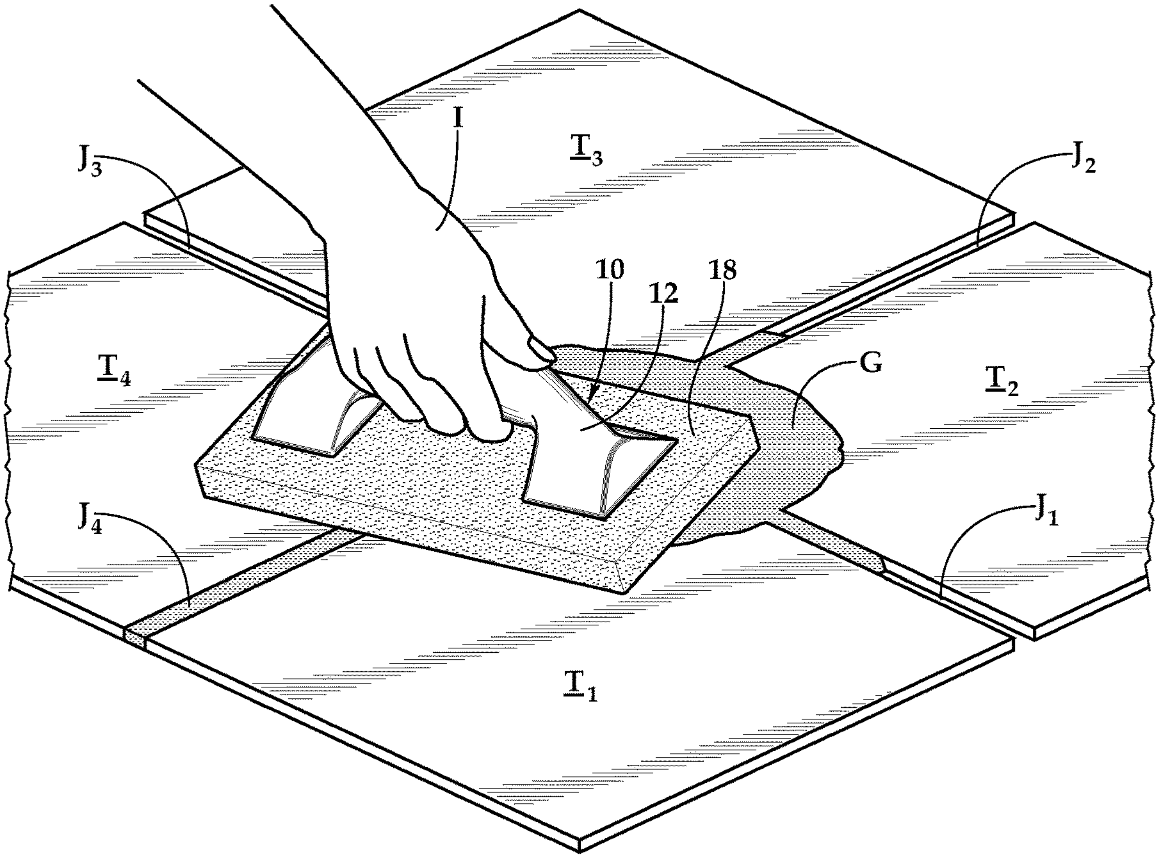
FIG. 21 is a side perspective view of the grout float and the handle for use of the same depicted in FIG. 1, in a first operational embodiment, being utilized in tile installation, according to the teachings presented herein.
Figure 22:
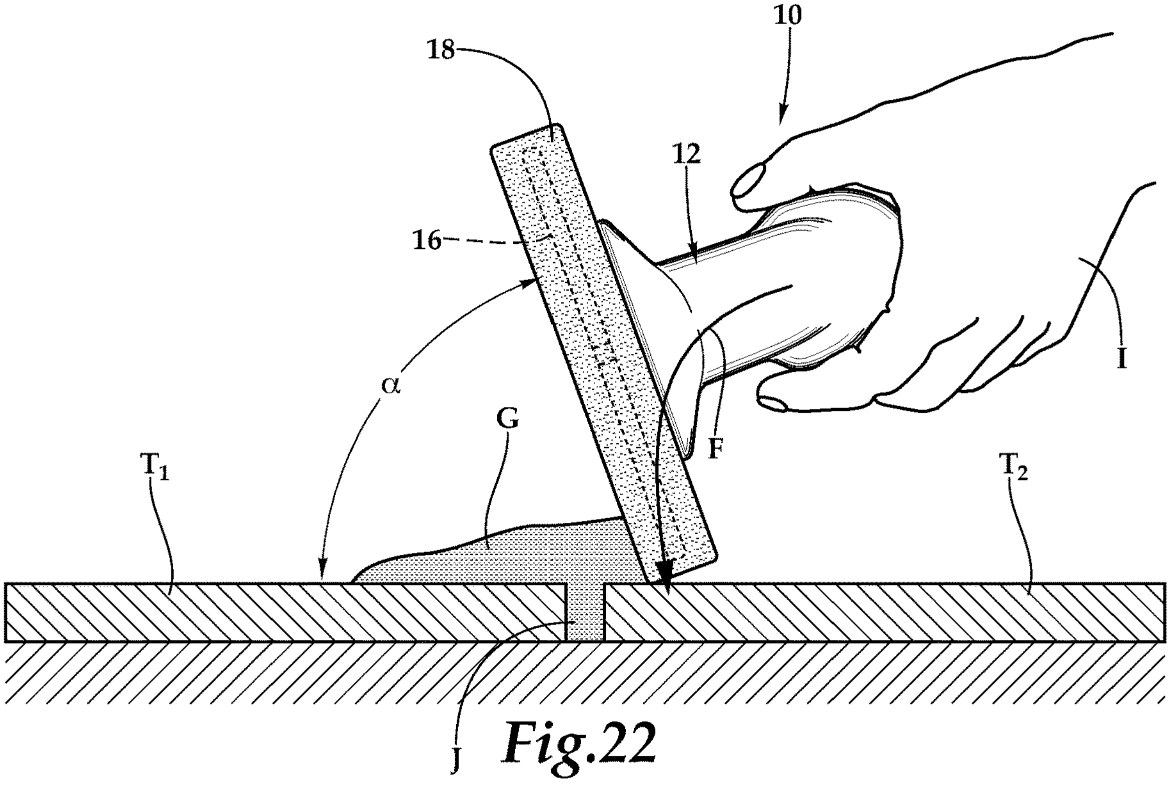
FIG. 22 is a side elevation view of the grout float and the handle for use of the same depicted in FIG. 1, in a second operational embodiment, being utilized in tile installation.

Referring now to FIG. 21, the grout float is being utilized by an installer I to install tile and, more particularly, tiles $T_1$, $T_2$, $T_3$, $T_4$. As shown, an excess amount of grout G is applied to the joints $J_1$, $J_2$, $J_3$, $J_4$ between the tiles $T_1$, $T_2$, $T_3$, $T_4$ using the grout float 10. More particularly, the grout G is pressed and worked into the joints $J_1$, $J_2$, $J_3$, $J_4$ with the intention of filling the voids. The grout float 10 may also be used to remove excess grout G. As shown in FIG. 22, in some embodiments, the installer I may position the grout float at an angle alpha α with the tile $T_1$. During the angular contact, the lateral sidewalls 50, 52, 60, 62 transfer force, as indicated by force transfer F, from the handle 12 to the blade 16 upon the pliable pad 18 of the grout float 10 angularly contacting the tile $T_1$ to remove the excess grout G with care being taken to avoid gouging the grouted joints $J_1$, $J_2$, $J_3$, $J_4$. The efficient transfer for force during the angular contact reduces fatigue of the installer's fingers, hand, and arm.

Figure 23:
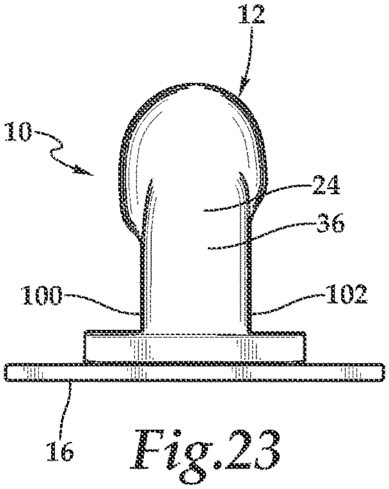
FIG. 23 is a front elevation view of another embodiment of a portion of a grout float with the handle for use of the same, according to the teachings presented herein.
Figure 24:
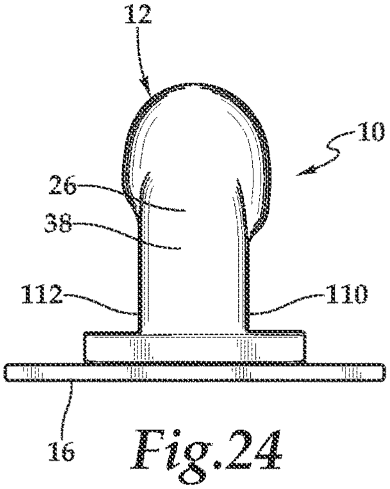
FIG. 24 is a rear elevation view of a portion of the grout float with the handle for use of the same depicted in FIG. 23.

Referring now to FIG. 23 and FIG. 24, in some embodiments of the grout float 10, the grout float 10 includes lateral sidewalls 100, 102, 110, 112 traversing the respective lateral surfaces 24, 26 of the handle 12. As opposed to lateral sidewalls 50, 52, 60, 62 discussed hereinabove, the lateral sidewalls 100, 102, 110, 112 are not burgeoning or tapering. As shown, the lateral sidewalls 100, 102 descend from the neck 36 to the blade 16 along the lateral surface 24 of the handle 12. Similarly, the lateral sidewalls 110, 112 descend from the neck 38 to the blade 16 along the lateral surface 26 of the handle 12.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A grout float comprising:

a handle secured to a blade, the blade being encased with a pliable pad;

the handle including a first end and a second end with first and second lateral surfaces, an inner surface, and an outer surface therebetween, the handle having a longitudinal axis bisected by a medial axis;

the handle including a first mounting nose and a second mounting nose respectively positioned at the first end and the second end, the first mounting nose transitioning upwardly to a first neck and the second mounting nose transitioning upwardly to a second neck, the handle including a gripping portion interposed between the first neck and the second neck, the gripping portion including a U-shaped grip recess beneath the handle above the blade;

the gripping portion of the handle having, at an intersection of the longitudinal axis and the medial axis, a zenith and a nadir, at least one of the zenith and the nadir being non-linear with respect to one of the longitudinal axis and medial axis;

the first mounting nose including a first pair of lateral sidewalls traversing the respective first and second lateral surfaces of the handle, the first pair of lateral sidewalls burgeoning from proximate the first neck to the blade;

the second mounting nose including a second pair of lateral sidewalls traversing the respective first and second lateral surfaces of the handle, the second pair of lateral sidewalls burgeoning from proximate the second neck to the blade;

the first and second pairs of lateral sidewalls being more distal to the longitudinal axis than the gripping portion; and the first and second pairs of lateral sidewalls transferring force from the handle to the blade upon the pliable pad of the grout float angularly contacting a work surface.

2. The grout float as recited in claim 1, wherein the gripping portion of the handle further comprises the zenith being non-linear with respect to the longitudinal axis and medial axis.

3. The grout float as recited in claim 1, wherein the gripping portion of the handle further comprises the zenith being non-linear with respect to the longitudinal axis.

4. The grout float as recited in claim 1, wherein the gripping portion of the handle further comprises the zenith being non-linear with respect to the medial axis.

5. The grout float as recited in claim 1, wherein the gripping portion of the handle further comprises the nadir being non-linear with respect to the longitudinal axis and medial axis.

6. The grout float as recited in claim 1, wherein the gripping portion of the handle further comprises the nadir being non-linear with respect to the longitudinal axis.

7. The grout float as recited in claim 1, wherein the gripping portion of the handle further comprises the nadir being non-linear with respect to the medial axis.

8. The grout float as recited in claim 1, wherein the gripping portion of the handle further comprises the zenith being non-linear with respect to the longitudinal axis and medial axis, the nadir being non-linear with respect to the longitudinal axis and medial axis.

9. A grout float comprising:

a handle secured to a blade, the blade being encased with a pliable pad;

the handle including a first end and a second end with first and second lateral surfaces, an inner surface, and an outer surface therebetween, the handle having a longitudinal axis bisected by a medial axis;

the handle including a first mounting nose and a second mounting nose respectively positioned at the first end and the second end, the first mounting nose transitioning upwardly to a first neck and the second mounting nose transitioning upwardly to a second neck, the handle including a gripping portion interposed between the first neck and the second neck, the gripping portion including a U-shaped grip recess beneath the handle above the blade;

the gripping portion of the handle including, at an intersection of the longitudinal axis and the medial axis, a zenith and a nadir, the zenith being non-linear with respect to the longitudinal axis.

10. The grout float as recited in claim 9, wherein the zenith is non-linear with respect to the medial axis.

11. The grout float as recited in claim 9, wherein the nadir is non-linear with respect to the longitudinal axis.

12. The grout float as recited in claim 9, wherein the nadir is non-linear with respect to the medial axis.

13. The grout float as recited in claim 9, wherein the zenith is non-linear with respect to the medial axis and the nadir is non-linear with respect to the longitudinal axis and the medial axis.

14. A handle for a grout float comprising:

a body having a first end and a second end with first and second lateral surfaces, an inner surface, and an outer surface therebetween, the body having a longitudinal axis bisected by a medial axis;

a first mounting nose and a second mounting nose respectively positioned at the first end and the second end, the first mounting nose transitioning upwardly to a first neck and the second mounting nose transitioning upwardly to a second neck, the body including a gripping portion interposed between the first neck and the second neck, the gripping portion including a U-shaped grip recess beneath the handle;

the gripping portion of the handle having, at an intersection of the longitudinal axis and the medial axis, a zenith and a nadir, at least one of the zenith and the nadir being non-linear with respect to one of the longitudinal axis and medial axis;

the first mounting nose being configured to secure to a blade;

the first mounting nose including a first pair of lateral sidewalls traversing the respective first and second lateral surfaces of the handle, the first pair of lateral sidewalls burgeoning outwardly along the first neck;

the second mounting nose being configured to secure to the blade;

the second mounting nose including a second pair of lateral sidewalls traversing the respective first and second lateral surfaces of the handle, the second pair of lateral sidewalls burgeoning outwardly along the second neck; and the first and second pairs of lateral sidewalls being more distal to the longitudinal axis than the gripping portion.

15. The handle as recited in claim 14, wherein the gripping portion of the handle further comprises the zenith being non-linear with respect to the longitudinal axis and medial axis.

16. The handle as recited in claim 14, wherein the gripping portion of the handle further comprises the zenith being non-linear with respect to the longitudinal axis.

17. The handle as recited in claim 14, wherein the gripping portion of the handle further comprises the zenith being non-linear with respect to the medial axis.

18. The handle as recited in claim 14, wherein the gripping portion of the handle further comprises the nadir being non-linear with respect to the longitudinal axis and medial axis.

19. The handle as recited in claim 14, wherein the gripping portion of the handle further comprises the nadir being non-linear with respect to the longitudinal axis.

20. The handle as recited in claim 14, wherein the gripping portion of the handle further comprises the nadir being non-linear with respect to the medial axis.

21. The handle as recited in claim 14, wherein the gripping portion of the handle further comprises the zenith being non-linear with respect to the longitudinal axis and medial axis, the nadir being non-linear with respect to the longitudinal axis and medial axis.

* * * * *